United States Patent [19]

Ayroldi

[11] Patent Number: 4,473,469
[45] Date of Patent: Sep. 25, 1984

[54] APPARATUS FOR RECOVERING FLUID SUBSTANCES FLOATING ON A WATER SURFACE

[76] Inventor: Giuseppe Ayroldi, Via Guido Zanobini, 55-00175 Roma, Italy

[21] Appl. No.: 353,355

[22] Filed: Mar. 1, 1982

[51] Int. Cl.³ .......................................... E02B 15/04
[52] U.S. Cl. ................................. 210/242.3; 210/923
[58] Field of Search ................. 210/242.2, 693, 242.3, 210/242.4, 219, 208, 923

[56] References Cited

U.S. PATENT DOCUMENTS

| 3,719,353 | 4/1973 | Cherne et al. | 210/242.2 |
| 3,822,789 | 7/1974 | Crisafulli | 210/923 |
| 3,980,559 | 9/1976 | Netzell | 210/242.3 |
| 4,196,087 | 4/1980 | Gordon | 210/923 |

FOREIGN PATENT DOCUMENTS 2050856  1/1981  United Kingdom ............. 210/242.4

OTHER PUBLICATIONS

Perry's Chemical Engineers Handbook, 4th Edition, "Centrifugal Pumps", p. 6-5, McGraw-Hill, New York 1963.

*Primary Examiner*—Peter A. Hruskoci
*Assistant Examiner*—Sharon T. Cohen
*Attorney, Agent, or Firm*—Bernard, Rothwell & Brown

[57] ABSTRACT

An apparatus for recovering fluid substances floating on a water surface or the like, and consisting of two symmetrical floating bodies connected by means of walls which form between them a longitudinal channel which is closed at its rear end by a transversal wall. The apparatus has a bottom wall which, beginning from a front weir sill positioned near the waterline, at first descends with a small slope and then slopes down rapidly so as to form the bottom of a calm basin which also extends backwardly beyond the floating bodies, said weir sill being wider than the distance between the outer side walls of the floating bodies. A chamber is provided behind the rear wall of the basin and communicates with the basin, through an orifice arranged in the wall near the bottom. The chamber also communicates with a conduit in which is mounted a propeller which rotates at an adjustable speed. Downstream of the propeller the conduit communicates with an outlet conduit, the outlet orifice of which is positioned always underneath the free water surface. Inside of the basin an apparatus for the collection and the removal of the oil is mounted.

4 Claims, 9 Drawing Figures

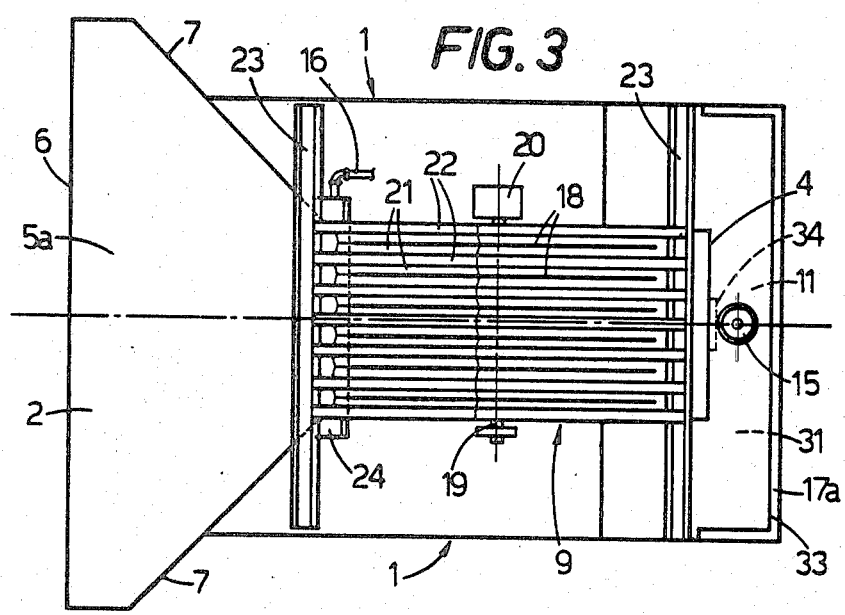
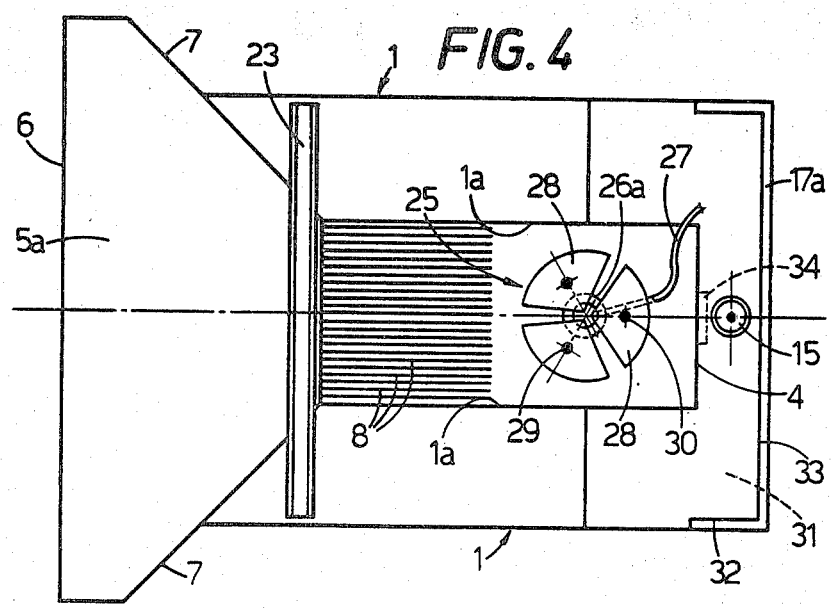

APPARATUS FOR RECOVERING FLUID SUBSTANCES FLOATING ON A WATER SURFACE

BACKGROUND AND SUMMARY OF INVENTION

The present invention relates to an apparatus adapted for the recovery of fluid substances floating on water surfaces or other calm liquids.

Various types of devices are already known for the recovery of fluid material which floats on calm water surfaces and which can be called of a "dipping" type, as, for instance, a system including disks or rollers rotating about a horizontal axis, or systems including a belt in continuous motion.

Said devices are caused to be lapped by the surface layer of the liquid so as to gather the oil layer therefrom which remains sticking to a gathering means and from which the oil is removed by the use of scraping means.

Already known are the apparatus which are called the "weir" type, comprising a body substantially of a well-like shape, the edge of which is maintained immersed below the liquid surface at a predetermined level by means of a system of floating bodies supporting the apparatus and through the bottom of which by means of pumps the surface layer of the liquid is removed, which flows over the sill.

However these devices have, in general, a very low efficiency, chiefly owing to the poor draw capacity which can be exterted on the outer liquid layer, while those of the "well" type present also the disadvantage that they remove, together with the polluting layer, a considerable amount of water which later must be separated from the oil at further expense.

SUMMARY OF THE INVENTION

The present invention provides an apparatus which aims to overcome the aforementioned inconveniences since it presents a much higher draw capacity on the polluted surface layer and is adapted to convey to the stocking tanks an oily polluting material which is practically in an anhydrous state.

Substantially the apparatus comprises two longitudinal floating hulls of a symmetrical configuration and which support vertical, transversal, inclined and horizontal walls which form between them a central channel which is closed at its rear and on the bottom and which ends at its front end with an entrance sill. At its central and rear parts the channel forms a calm basin of a considerable depth which extends beyond the floating bodies and/or which may also become larger behind the floating bodies. Beginning from said basin, the channel bottom rises upwardly along a substantially vertical wall and then it extends towards the sill with a very small slope and becomes larger in width so as to hang out over the floating hulls so that a very large weir sill is available in order to permit operation on a water band of a width which is greater than the total width of the floating bodies and the interposed channel, thus speeding up the cleaning-up operations on a large water band. At the rear part of the basin a chamber of a predetermined volume is provided which communicates with said basin by means of an orifice arranged near the bottom of the basin. Said chamber is connected with a first conduit into which a propeller is mounted which rotates at an adjustable speed. This first conduit, downstream of the propeller, leads to a second vertical conduit which extends behind the said chamber and said apparatus and which also partially surrounds the sides of the chamber or of the channel; said conduit opens at a short distance unerneath the liquid surface.

Owing to the positioning of such entrance orifice in the chamber, only the water which is contained in the basin will be sucked and then expelled through the discharge orifice of said vertical conduit.

An apparatus for removing the oily material is placed at the central part of the calm basin. This apparatus may be consitituted of a series of disks mounted on a transversal revolving shaft and partially immersed in the liquid of the channel, said disks cooperating with oil scrapers in order to remove the oil collected by the disks surfaces. Or an apparatus of a floating type can be used which acts as an oil collecting means of a "weir" type.

The apparatus of the invention has the distinction that it is shaped and dimensioned so as to have an operative self-adjusting effect. That means that the stesses involved, which act on the apparatus when the propeller is stationary, are such as to maintain the entrance sill lifted at a very small distance above the level of the liquid surface. When the propeller goes into action and the number of its revolutions is adjusted (thereby adjusting the delivery of the water sucked into the chamber and then discharged through the outlet conduit), the apparatus automatically rotates according to the counterclockwise pitching direction. This rotation brings the weir sill which serves as access into the channel formed between the floating hulls to the desired depth, which is determined by the thickness of the oily material which is to be removed. The geometry of the system provides that the center of gravity of that part of the water mass which fills the channel, and which is removed when the pump becomes operative, is shifted backwards as far as possible with respect of the center of gravity of the whole system in its operative condition. The result is that, the more the height of the water mass contained into the channel and in the chamber in which operates the propeller diminishes, the more the apparatus weight will decrease, at the part behind its center of gravity. This will cause a rotation in the front of the apparatus, causing the entrance sill to be lowered such that the immersion depth of said sill below the liquid surface is increased as a direct function of the speed of rotation of the propeller.

The characteristics that this apparatus must have will now be explained in a more detailed manner, reference being made to the accompanying drawings, in which:

BRIEF DESCRIPTION OF THE DRAWINGS

FIG. 3 is a top view of the apparatus according to the embodiment of FIGS. 1 and 2;

FIG. 4 shows, in a top view, a variant, in which in the apparatus, according to the preferred embodiment of FIGS. 1 and 2 is mounted an apparatus for collecting the oil of the so called "weir" type, operating inside the calm basin;

DESCRIPTION OF THE PREFERRED EMBODIMENT

Figure 1:
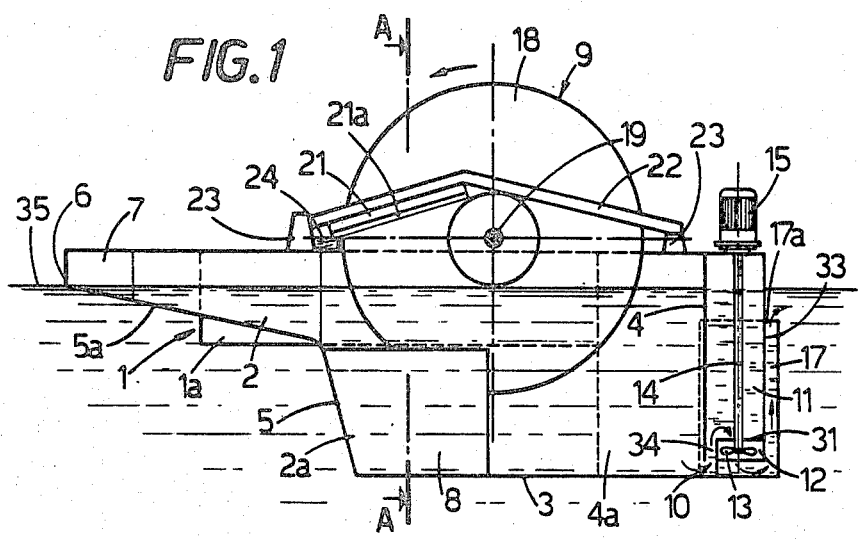
FIG. 1 shows a vertical longitudinal sectional view of an apparatus according to the preferred embodiment and in which the oily material is collected by means of a system of a type which includes revolving disks and which operates in the inside of the calm basin.

With reference to the drawings and to the preferred embodiment, shown in FIGS. 1 to 5, the apparatus comprises two longitudinal floating hulls 1 substantially of the same configuration, but symmetrical with respect of the vertical longitudinal center plane of the apparatus and which are made integral with and spaced away from one another by means of walls made of metal sheet or other suitable material, said walls forming between the hulls 1 a longitudinal channel of a depth which increases from the front to the rear end, which is closed by a vertical wall 4. Said channel comprises a front section 2 and a central and rear section 2a which forms a deep calm basin. For such a purpose the inner walls of the hulls of floating bodies 1 extend in a downward direction by longitudinal walls 4a, reaching the depth of the rear wall 4 and joining with a horizontal bottom 3 which at its front part joins, in turn, with a transverse, slightly bent forward wall 5 which, in turn, joins with a slightly inclined wall 5a which becomes larger as it rises towards the entrance sill 6 of the channel 2, 2a and which projects laterally beyond the floating bodies 1 (FIG. 4).

Reference number 7 indicates the side walls which serve to contain and guide the fluid flow which flows over the sill 6 such that the flow is guided so as to be channelized into the calm basin 2a of the channel 2, 2a. In such a way a very broad weir sill 6 is obtained so as to permit operation on a water band larger than the maximum width between the outer parts of the floating hulls 1, thus speeding up the cleaning-up operations on the water surface.

Near the front part and the bottom of the calm chamber 2a a plurality of vertical parallel baffles 8 are provided to brake the movement of the liquid flow which comes out of the channel length 2 into the basin 2a, thus promoting the collection of the oil drops on the surface layer, given that the fluid flow can reach into the basin 2a from the first channel length 2 with a certain speed and velocity. In such a way it is ensured that all the oil drops gather on the surface of the basin 2a, while on the bottom there is only water which will pass without the polluting material to the chamber 11 positioned behind the basin, or will be described below.

In the first embodiment shown in FIGS. 1 to 4 the calm basin is separated by means of a transversal wall 4 from a chamber 11 which communicates with the calm basin 2a through an orifice 10 (FIG. 1) arranged in said wall 4 near the bottom 3 and which is connected with a conduit 34. The chamber 11 extends laterally behind the floating bodies 1 and is formed by a bottom wall 31, side walls 32 and a rear wall 33.

In the bottom 31 of the chamber 11 opens a vertical conduit 12 inside of which is housed a propeller 13 fixed on a vertical shaft 14 driven by a motor unit, generally indicated 15 and which may include a gear box (not shown) and which could be absent in the apparatus which are designed to operate in constant site conditions.

The propeller 13 is prearranged so as to be able to rotate in the direction which permits water to be sucked from chamber 11 and to be conveyed through conduit 12 and a discharge vertical conduit 17, the output orifice 17a of which opens behind the apparatus and at a certain distance below the water surface 35 at a level less than that of the weir sill 6 in all the operative conditions of the apparatus.

Figure 2:
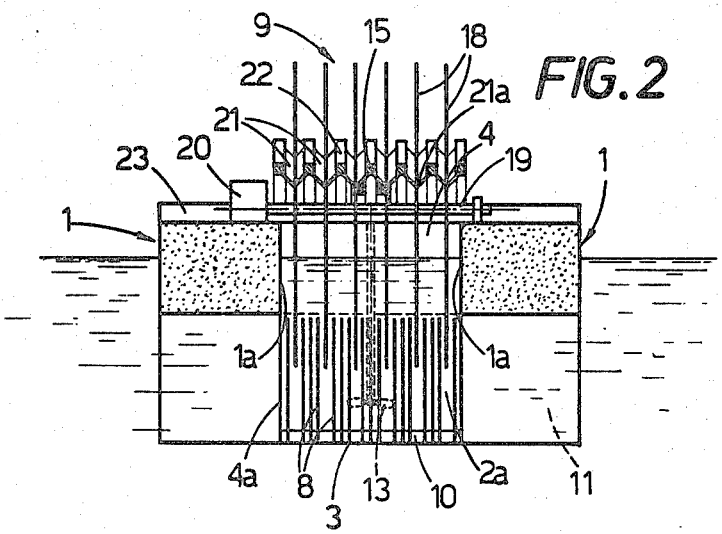
FIG. 2 is a cross-section A—A of FIG. 1.

According to the first embodiment (FIGS. 1 to 3) the apparatus is provided with an oil collecting device of a known type, generally indicated 9, and which is formed by a plurality of disks 18 fixed on a common shaft 19 and spaced apart from each other; said shaft receives a rotary movement by a motor unit 20 mounted on one of the floating bodies 1 (FIG. 2).

The disks 18 are partially immersed in the water contained in the calm basin 2a, where the oily material tends to gather on the surface and to stick to the disks 18, while the water without oil decants upon the bottom 3 of the basin 2a. The disks 18, which rotate in the direction of the arrow shown in FIG. 1, plunge into the oil layer floating on the water in the calm basin 2a, which sticks to the side surfaces of the respective disks 18 under the well known physical effect. The oil layers are then removed from the disks 18 by means of stationary scrapers 21 which consists of inclined wall elements, the edges 21a of which lean with a light friction along the faces of the revolving disks 18, said scrapers being supported by longitudinal beams 22 which pass between the disks 18 and which are carried at their ends by transversal beams 23 supported by the floating bodies 1, while the inner channels which are formed by the wall elements 21 and by the adjacent faces of the disks bring down the oil into a transverse collecting channel 24, which conveys said oil into a pipe connected a collecting tank or the like (not shown).

The apparatus for the collection of the oil, according to the variant of FIG. 4, is of the so called "weir" type and is generally indicated 25. It comprises a collection trap 26 supported by the floating bodies 28, the edge 26a of which floats at a short distance underneath the liquid contained in the calm basin 2a, which edge constitutes the weir sill through which is removed and recovered the oil sucked by a pump (not shown) and which is connected to the bottom of the trap 26 by a flexible hose 27.

Vertical guiding rods 29 are provided which are fixed at their lower ends to the bottom 3 of the basin 2a of the channel 2, 2a and which pass through the floating bodies 28 by means of guiding holes 30 designed to maintain the apparatus 25 in true position, so as to permit free up and down movement thereof.

Now the principle upon which is based the structure of the apparatus, in order that it can be self-floating and have a sill which can operate at different depths by adjusting the rotation speed of the propeller 13, will be described in detail.

Figure 5:
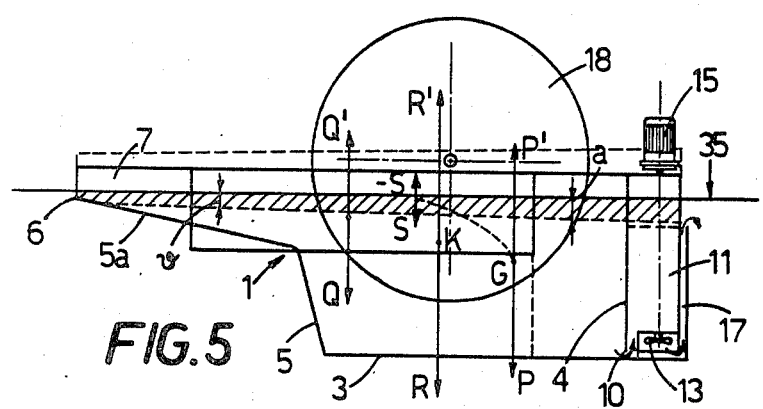
FIG. 5 diagrammatically shows the sectional view taken on the vertical longitudinal center plane of the apparatus, according to the preferred embodiment, with the representation of the main stresses which act thereon during its operation.

For such a purpose reference is made to the apparatus diagram shown in FIG. 5, in which are indicated the main stresses, which consist of the resultant Q of the tare weight of the apparatus and of the resultant P of the water weight contained therein, this weight being variable, i.e. it can pass from a maximum, if the propeller 13 is stationary, to values which decrease, as the number of revolutions of the propeller 13 increases.

For the apparatus to float, it is necessary that P and Q are counterbalanced by buoyancies P' and Q' of an opposite sign. As can be seen in FIG. 5, the apparatus has been planned in such a manner that the application point of the vector P must be displaced backward as far as possible with respect to the application point of the vector Q.

That will have as a result that when the propeller 13 is stationary and P is maximum in this condition the apparatus must remain in a sustantially horizontal buoyancy condition with the sill 6 placed nearly at the level of the liquid surface.

When the propeller 13 goes into action, under the effect of the decrease of the inner water head of the apparatus, the value of the vector P will decrease and the apparatus will have to find a new condition of hydrostatic equilibrium. At "a" is indicated the amount of the mean value of the difference in height between the starting head of the water contained in the channel 2, 2a and the final one when the apparatus will be lightened by the weight S of the water which formerly occupied the layer "a".

Figure 6:
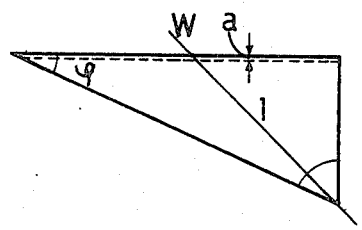
FIGS. 6 and 7 show respectively the top view and the view of the longitudinal side of a channel having a longitudinal triangular section of the simplest embodiment.
Figure 7:
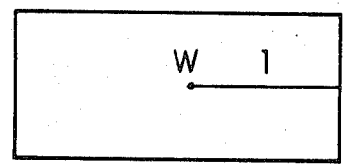

Therefore the apparatus will rotate forwards or backwards through an angle $\phi$ about the pitching axis according to the application point of the vector R which is the resultant of the weights P and Q. The main task of the planning will be therefore, that it is necessary that the application point of the vector S be displaced as far as possible behind the application line of vector R. I.e. in practice one desires to obtain a floating system which can be self-balancing, by making the delivery of the weir flow equal to the delivery of the propeller 13. It is therefore necessary that the weir sill is immersed more and more, as a direct function of the increase of the delivery of the discharged water flow, which, in turn, is a direct function of the rotation speed of the propeller 13. In order to obtain that, it is necessary to duly plan the configuration of the channel 2, 2a and of the chamber 11, which are designed to be filled up by water, while the floating hulls 1 must have their center of hydrostatic thrust positioned in a same transverse plane which passes through the center of gravity of the empty structure and which must have the shortest possible longitudinal development. As far as the channel is concerned, the simpliest solution would be to construct said channel with constant longitudinal sections of the form of a rectangular triangle, as shown in FIG. 6 and 7 and with a small as possible inclination angle $\phi$ of the bottom. In this case in fact the center of gravity W of the surface layer of the water contained in said type of simplified channel, will be displaced backwards with the greatest possible rapidity as soon as the difference of height "a" increases. To this simple embodiment of the channel (FIG. 6 and 7) some improvements can be applied, however, which are present in the embodiment till now described. In order to obtain an increase of the suction force exterted on the oil layer to be collected, it is necessary to increase as much as possible the amplitude of the weir sill 6 in the front thereof.

Figure 8:
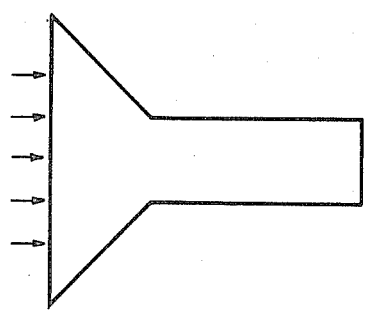
FIG. 8 shows, in a top view, a first variant of the configuration of the inner channel of a simple type, shown in FIGS. 6 and 7.
Figure 9:
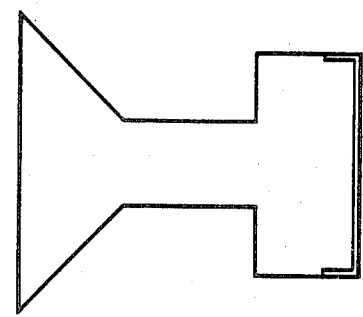
FIG. 9 shows, in a plan view, a channel which enlarges at its rear part so that the center of gravity of the water contained into the apparatus will be displaced further backwards as provided in the preferred embodiment of the present invention, shown in the FIGS. 1 to 5.

In fact at a given delivery from the propeller 13, the suction results to be broader and the overflowing liquid head to be smaller, the broader the development of the weir sill. The simplified channel shown in FIGS. 6 and 7 should have in plan the configuration shown in FIG. 8. But such a configuration would displace too much forwards the center of gravity of the uppermost water layers contained into the channel with harmful consequences, and that would cause, at least at the beginning, too considerable a displacement forwards of the application point of the vector S. Therefore, in order to balance the increased amplitude of the front portion of the channel, due to the provision of an enlarged weir sill 6, it was thought therefore to enlarge also the channel portion which is positioned behind the floating bodies 1 (FIG. 9). It is also to be noted that on a theoretical point of view it is better that the angle $\phi$, which corresponds to the chosen maximum value of the pitching angle, be as small as possible. Practical tests which are carried out have proved that the optimal value of $\phi$ is of about 15°-20°.

It has also been found advantageous to modify the constant gradient of the angle $\phi$ of the bottom after the first lenght 2 of the channel, by providing an inclining bottom so as to form a calm chamber 2a which is deeper, for the purpose of having a water mass of a greater volume which allows a better dampening of the polluted water flow entering the first length 2 of the channel through the weir sill 6 and which reaches the chamber 2a with the best possibility of containing the recovered floating oils.

With this object in view, a plurality of vertical parallel baffles 8 are provided which cooperate in the braking of the speed of the water entering the basin 2a, as well as in the hampering of the travel of the collected oil drops.

It is to be noted that in the preferred embodiment which has been illustrated, provision has been made to have a rear chamber 11 which enlarges laterally, extending behind the floating bodies and which, in addition to constituting the suction chamber of the propeller, serves also to displace in a backward direction the center of gravity of the water which is contained between the floating bodies 1. Of course, the chamber 11 could also have a reduced size, the smaller volume of said chamber being compensated by enlarging the rear portion of the calm basin 2a behind the floating bodies 1. Theorically the same purpose could be attained by increasing the length of the calm basin, but this solution is not convenient in practice, since the length of the apparatus would be increased too much.

What I claim is:

1. An apparatus for the recovery of fluid substances floating on water surfaces or the like, characterized by the fact that the apparatus comprises: two floating bodies or hulls having a symmetrical configuration with respect to the longitudinal vertical center plane of the apparatus and which are spaced apart from one another and are connected to longitudinal and traverse vertical walls as well as to inclined and horizontal walls which form a longitudinal channel which begins at the front part of the apparatus with a weir sill, and which is closed at the bottom and at the rear end of said channel, the rear portion of the channel being deeper than the front portion of the channel so as to form a calm basin closed at the rear end by a transverse wall behind which a chamber is arranged which leads to a calm basin through a conduit having an orifice arranged in the lowest portion of the wall while in the bottom of the chamber a conduit opens in which operates a propeller driven by a motor of an adjustable speed, the outlet end of the conduit being connected to a discharge conduit, the outlet orifice of which is so positioned as to be spaced apart from the water surface, inside of the basin a device being mounted adapted to collect the floating fluid, the apparatus being so constructed that the center of gravity of the apparatus, when in empty condition, is placed before the center of gravity of the water mass which can be contained in the channel and in the chamber, when the propeller is stationary, and the floating bodies have their buoyancy centers placed in the transverse plane passing through the center of gravity of the empty apparatus, and wherein the configuration of the channel is such that as the propeller becomes operative the center of gravity of the water layer which is removed, in order to create a difference in level between the outer water head and the inner head, is displaced behind the center of gravity of the apparatus at its maximum weight, so that the removal of the water layer rotates the floating apparatus around the pitching axis of the apparatus in order to lower the sill to a predetermined depth.

2. An apparatus according to the claim 1, wherein the channel beginning from the weir sill, comprises a first section having a slightly inclined bottom, according to the maximum pitching angle which one will yield to the apparatus, and a second section formed by a front wall a bottom, a rear wall and side walls, which forms a broad calm basin after the first section, while the weir sill has a width greater than the distance between the outer surface of the floating bodies, said enlarged portion of the first section of the channel being provided laterally with containment side walls.

3. An apparatus according to claim 1, wherein into the calm basin vertical partitions are mounted adapted to dampen the water movements and to promote the ascent of said fluid substances.

4. An apparatus according to claim 1, wherein the configuration of the channel can be simplified in such a way that the channel takes the shape of an element having parallel longitudinal walls which are coplanar with the inner longitudinal walls of the floating bodies, and a bottom of a constant slope of an angle equal to the pitching angle which may be foreseen and which begins from the sill and which reaches the lower end of the rear wall of the basin.

* * * * *

UNITED STATES PATENT AND TRADEMARK OFFICE
CERTIFICATE OF CORRECTION

PATENT NO.   : 4,473,469
DATED        : September 25, 1984
INVENTOR(S)  : Giuseppe Ayroldi It is certified that error appears in the above-identified patent and that said Letters Patent is hereby corrected as shown below:

Col. 2, line 3, delete "unerneath" and substitute therefor -- underneath --.

Col. 3, line 18, delete "EMBODIMENT" and substitute therefor -- EMBODIMENTS --;

line 62, delete "or" and substitute therefor -- as --.

Col. 4, line 44, between "connected" and "a" insert -- to --.

Col. 5, line 16, delete "sustantially" and substitute therefor -- substantially --.

Signed and Sealed this

Twenty-first Day of May 1985

[SEAL]

Attest:

DONALD J. QUIGG

Attesting Officer    Acting Commissioner of Patents and Trademarks